(No Model.) 2 Sheets—Sheet 2.
P. D. HARTON.
CAKE MACHINE.
No. 501,274. Patented July 11, 1893.
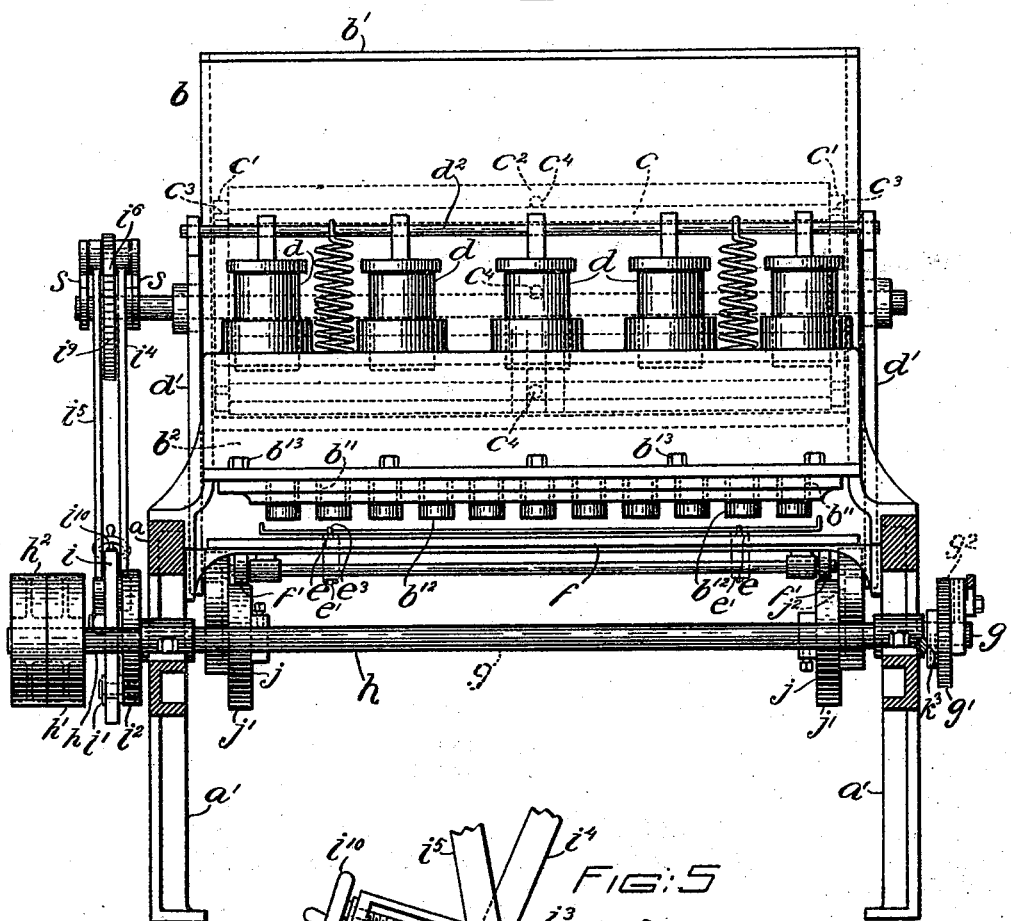
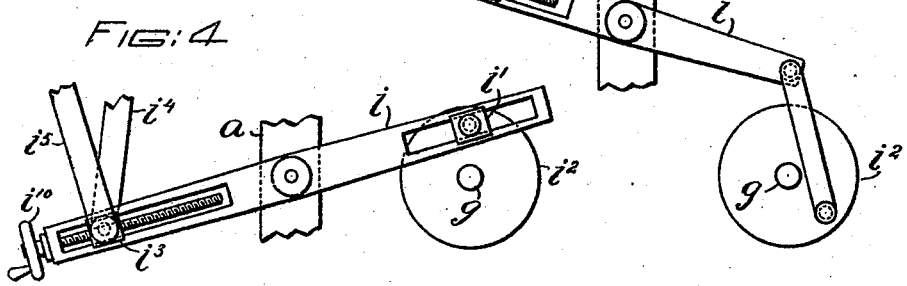
WITNESSES:
Thomas M. Smith.
Richard C. Maxwell.
INVENTOR:
Pembroke D. Harton,
By J. Walter Douglass.
ATT'Y.

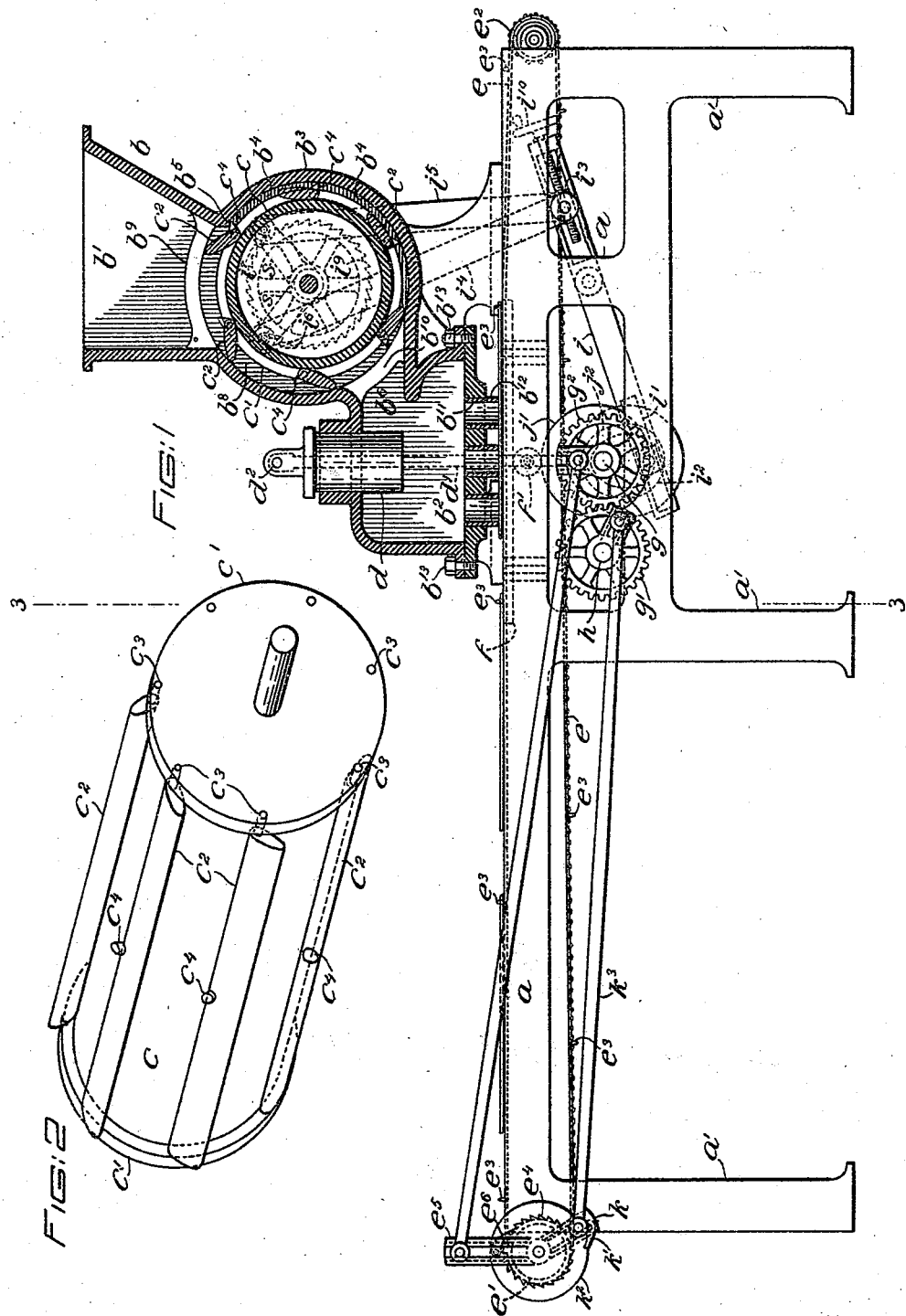

UNITED STATES PATENT OFFICE.

PEMBROKE D. HARTON, OF PHILADELPHIA, PENNSYLVANIA.

CAKE-MACHINE.

SPECIFICATION forming part of Letters Patent No. 501,274, dated July 11, 1893.

Application filed April 7, 1893. Serial No. 469,385. (No model.)

*To all whom it may concern:*

Be it known that I, PEMBROKE D. HARTON, a citizen of the United States, residing at the city of Philadelphia, in the county of Philadelphia and State of Pennsylvania, have invented certain new and useful Improvements in Cake-Machines, of which the following is a specification.

The principal objects of my invention are first, to provide a durable, efficient and comparatively inexpensive machine for shaping or molding a plastic mass into cakes, crackers and the like and depositing the same in or on pans or other receptacles; second, to provide comparatively simple, positive and reliable means for feeding the plastic material into the machine; third, to provide compact mechanism for operating the moving parts of the machine with a positive motion; fourth, to provide means for adjusting the feed, while the machine is in operation; and fifth, to provide compartively simple mechanism for feeding the pans or receptacles for the molded plastic mass with a differential motion.

My invention consists of a cake machine, comprising a feed-roller provided with pivotal paddles or deliverers having lugs adapted to collide with a projection near the mouth of a supply chamber or hopper to cause the paddles or deliverers to assume an open position for receiving and conveying plastic material therefrom and to be maintained in an open position in the range of the mouth thereof and to a rib, bar or arch located in the lower part of the casing of the feed-roller for rocking the paddles or deliverers into closed position during the discharge tangentially of the plastic material through a throat or outlet into a reservoir, a plunger for controlling the passage of the plastic material from the reservoir through openings, molds or dies in the base thereof, an endless conveyer and movable table for presenting the pans or other receptacles for the reception of molded plastic material, and mechanism for operating the feed roller plunger, endless conveyer and table.

My invention further consists of a cake machine provided with a feed-roller having a ratchet-wheel, a positively driven shaft, a rocker-arm operated by said shaft, links pivoted at one of their extremities to the free end of the rocker-arm and provided at their other extremities with pawls operating alternately on opposite sides of the ratchet-wheel, and means for shifting the pivot of the links in respect to the fulcrum of the rocker-arm.

My invention further consists of the improvements in cake machines hereinafter described and claimed.

The nature, general features and scope of my invention will be more fully understood from the following description taken in connection with the accompanying drawings forming part hereof, and in which—

Figure 1, is a view partly in side elevation and partly in section of a cake machine, embodying features of my invention. Fig. 2, is a perspective view of the feed-roller. Fig. 3, is an end view partly in section on the line 3—3, of Fig. 1. Fig. 4, is a detail view of the rocker-arm that serves to impart motion to the pawls that drive the feed-roller; and Fig. 5, is a view illustrating a modified form of mechanism for operating the rocker-arm.

In the drawings $a$, is the main-frame of the machine and $a'$, the standards thereof.

$b$, is an open top housing mounted upon the main-frame $a$, and provided with a supply chamber or hopper $b'$, a reservoir $b^2$, and a cylindrical casing $b^3$, interposed between and in communication with the mouth of the supply chamber or hopper $b'$, and the outlet or throat $b^6$, of the reservoir $b^2$.

$c$, is a feed-roller provided at its heads or ends with flanges $c'$, and revolubly supported in the casing $b^3$, for a purpose to be presently fully described.

$c^2$, are paddles or deliverers pivotally attached at or near their inner edges by means of pintles $c^3$, as illustrated in Fig. 2, to the heads or ends $c'$, of the feed-roller, so that the paddles or deliverers $c^2$, may be rocked in respect to the face of the feed-roller $c$.

Each paddle or deliverer $c^2$, is provided with a lug or pin $c^4$, adapted to travel in a slot $b^4$, formed in and extending nearly two-thirds of the entire circumference of the interior wall of the cylindrical casing $b^3$, and adapted to collide with a projection $b^5$, located near the mouth of the supply chamber or hopper $b'$, in order to rock it into open position for receiving and conveying plastic material around the annular or cylindrical space $b^8$, to the left of the cylindrical casing $b^3$, as illustrated in Fig. 1.

At or near the mouth of the supply chamber or hopper $b'$, is provided an arch or device $b^9$, adapted to control the extent of movement of the pivotal paddles or deliverers $c^2$, in respect to the range or length thereof and to prevent them after the deposited material has been brought into contact therewith and the paddles thrown open, from assuming a reverse or closed position in their travel to the left until the material has been thrown off tangentially through the throat $b^6$, into the reservoir $b^2$, when the paddles again contact with a similar arch or device $b^{10}$, beneath the feed-roller $c$, and the paddles or deliverers again assume a closed position in their travel to the right in the cylindrical casing $b^3$, as illustrated in Fig. 1. The space between the feed-roller and the casing to the left in its travel therein, is such as that the paddles or deliverers are always maintained in an open position so as to convey the deposited material therethrough and discharge the same tangentially through the throat $b^6$, into the reservoir $b^2$, while the distance between the feed-roller and the casing to the right is such as that the paddles will be maintained in a closed position in contact with the periphery.

Hitherto it has been suggested to employ a feed-drum having wings connected in pairs and afforded a range of play in radially disposed slots therein, but in practice the plastic material engaged owing to its nature between such wings and the walls of the radially disposed slots and thus became wedged in the former in such manner as that they were prevented from moving or performing their functions, whereby the feed-drum was rendered inoperative and useless. The hereinabove described paddles or deliverers in effect are hinged to the face of the feed-roller $c$, and consequently cannot become wedged by the plastic material in any such manner as above explained, and in practice they have proven most satisfactory.

$d$, are plungers penetrating the top wall of the reservoir $b^2$, and adapted to control the passage of the plastic material from the reservoir $b^2$, through openings, molds or dies $b^{11}$, in the bottom wall thereof. In the present instance these dies, molds or openings $b^{11}$, are provided with flanges $b^{12}$, cut or otherwise formed in a plate detachably connected with the base or wall of the reservoir by means of bolts $b^{13}$, so that the plate may be removed and replaced by another plate having differently shaped dies, molds or openings.

$e$, is an endless conveyer guided by means of sprocket-wheels $e'$ and $e^2$, journaled to the main-frame $a$, and provided with vertical pins $e^3$, adapted to engage eyes attached to pans or other receptacles.

$f$, is a table afforded a range of vertical movement in ways in the main-frame $a$, and adapted to lift the upper side of the endless conveyer in order to bring the pans or other receptacles into range of the depending flanges $b^{12}$, of the openings or molds $b^{11}$.

$g$, is a main-shaft positively driven through the instrumentality of gear-wheels $g'$ and $g^2$, by a driving shaft $h$, having tight and loose pulleys $h'$ and $h^2$, to which power is applied.

$i$, is a rocker-arm centrally pivoted to the main-frame $a$, and having one of its extremities provided with ways $i'$, for the accommodation of a block journaled to a crank-pin projecting from a disk $i^2$, keyed or otherwise secured to the main-shaft $g$, and located outside of the main-frame $a$. However, if preferred the ways $i'$ and their complemental pivot block may be dispensed with. In such case the end of the rocker-arm $i$, is connected with the crank-pin of the disk $i^2$, by means of a connecting-rod as shown in Fig. 5. The free end of this rocker-arm $i$, is also provided with ways for the accommodation of a block $i^3$, to which the lower extremities of the links or bars $i^4$ and $i^5$, are pivotally attached. The upper extremities of these links or bars, are provided with pawls $i^6$ and $i^7$, operating alternately upon the teeth of a ratchet-wheel $i^9$, keyed to the axis of the feed-roller $c$, in order to effect the rotation of the latter.

$s$, are pivotal-arms journaled at one of their extremities to the axis of the feed-roller $c$, and connected at their opposite extremities with the bars or links $i^4$ and $i^5$, in order to prevent accidental displacement of and to guide the latter.

$i^{10}$, is a set-screw provided with a hand-wheel and adapted to afford means for adjusting the block $i^3$, in respect to the fulcrum of the rocker-arm $i$, whereby the throw of the pawls $i^6$ and $i^7$, may be adjusted, while the machine is in operation, in order to increase or diminish the velocity of movement of the feed-roller $c$, and consequently the feed of the plastic material.

$j$, are cams or eccentrics keyed or otherwise secured to the shaft $g$, and provided with faces $j'$, engaging rollers $f'$, depending from the table $f$, and with grooves $j^2$, engaging rollers attached to the lower ends of the rods $d'$, having their upper ends attached to a bar $d^2$, penetrating eyes projecting upward from the plungers $d$, so that the cams or eccentrics operate first to lift the table $f$, and depress the plungers $d$, and then to depress the table $f$, and lift the plungers $d$.

The sprocket-wheel $e'$, is provided with a ratchet-wheel $e^4$, and with a pivotal-arm $e^5$, having a pawl $e^6$, adapted to mesh with the ratchet-wheel $e^4$. This arm $e^5$, is rocked or oscillated by means of a link having its respective extremities connected with posts afforded a range of adjustment in radial slots in the arm $e^5$, and gear-wheel $g^2$, whereby the throw of the link, and consequently the range of movement of the pawl $e^6$, and speed of the endless conveyer may be increased or diminished. The pawl $e^6$, and ratchet-wheel $e^4$, serve to drive the endless conveyer $e$, at a comparatively low rate of speed.

$k$, is an arm pivotally mounted on the axis of the sprocket-wheel $e'$, and provided with a pawl $k'$, adapted to mesh with a single space cut or otherwise formed in a ratchet-wheel $k^2$.

$k^3$, is a link connected at its respective extremities with posts afforded a range of adjustment in radially disposed slots cut or otherwise formed in the arm $k$, and gear-wheel $g'$, in order to permit of the regulation of the throw of the pawl $k'$, and consequently of the travel of the endless conveyer $e$. The pawl $k'$, and ratchet-wheel $k^2$, serve to drive the conveyer $e$, for a distance corresponding to the length of the pan or receptacle at a comparatively high rate of speed, whereby the pans or receptacles are brought rapidly beneath the die or openings $b^{11}$, in order to receive the molded material, and are also rapidly withdrawn therefrom after being filled. In this connection it may be remarked, that while the pans are being filled they are fed slowly by means of the pawl $e^6$, in order to cause the deposits of molded material to be distributed evenly up and throughout the pan or receptacle, so that a differential motion is imparted to the pans or other receptacles by means of the pawls $k'$ and $e^6$, and their accessories.

The mode of operation of the hereinbefore described cake machine, is as follows:—Plastic material, as dough or similar material, is deposited in the supply chamber or hopper $b'$, and is conducted around the left hand side of the feed-roller $c$, by means of the paddles $c^2$, which for this purpose are rocked into open position by means of the pins $c^4$ and projection $b^5$, and which are subsequently rocked into closed position by means of the rib or arch $b^{10}$ upon and during the discharge tangentially of the plastic material through the outlet or throat $b^6$, into the reservoir $b^2$. The pawls $i^6$ and $i^7$, serve to rotate the feed-roller $c$, and the speed of the latter and consequently the rate at which the plastic material is fed into the reservoir $b^2$, may be increased or diminished by means of the set-screw $i^{10}$, while the machine is in operation, as has been hereinbefore explained. The endless conveyer $e$, moving rapidly under the influence of the pawl $k'$, causes a pan or other receptacle to be brought beneath the molds, dies or openings $b^{11}$, whereupon the cams $j$, first lift the table $f$, and depress the plungers $d$, and then lift the plungers $d$, and depress the table $f$. During the elevation of the table and the depression of the plungers, the latter cause the plastic material to be compressed in the reservoir $b^2$, with the result that it is forced through the openings or dies $b^{11}$, in its required molded state and deposited upon the pan or other receptacle. As the pan is descending the plungers ascend, thus relieving the pressure against the plastic material in the reservoir $b^2$, so that the flow thereof through the openings or dies $b^{11}$, is checked. The pan is then fed slowly forward by the pawl $e^6$, until the previously deposited material is removed from beneath the openings or dies $b^{11}$, whereupon the hereinabove explained operation is repeated and the molded plastic material is deposited upon the remaining portions of the pan or other receptacle. As soon as the pan or receptacle for the said molded material is filled, it is fed rapidly by the pawl $k'$, toward the right hand end of the machine, and may then be removed to bake or otherwise treat the plastic material deposited thereon.

Having thus described the nature and objects of my invention, what I claim as new, and desire to secure by Letters Patent, is—

1. In a cake machine, a feed-roller provided with pivotal paddles or deliverers having lugs contacting with means connected with the cylindrical casing and adapted to rock the paddles or deliverers into open position and to maintain the same in such position during the reception and conveyance of the plastic material, a rib, bar or arch for rocking the paddles or deliverers into closed position upon or during the throwing off tangentially of the plastic material into a reservoir, and means, substantially as described, for operating the feed-roller, substantially as and for the purposes set forth.

2. In a cake machine, a rotating feed-roller having flanged heads, paddles provided near their edges with pintles journaled to said flanges and with lugs and a casing provided with means for engaging said pins and with bars or ribs in range of said paddles, substantially as and for the purposes set forth.

3. A cake machine provided with a feed-roller having a ratchet-wheel, a positively driven shaft, a rocker-arm actuated by said shaft, links pivoted at one of their extremities to the free end of the rocker-arm and provided at their other extremities with pawls operating alternately on opposite sides of the ratchet-wheel, and means for shifting the pivot of the links in respect to the fulcrum of the rocker-arm, substantially as and for the purposes set forth.

4. In a cake machine, a feed-roller having a ratchet-wheel, links provided with pawls meshing with said ratchet-wheel, a rocker-arm for operating said links, and a hand-wheel and set-screw for shifting the pivot of the links in respect to the fulcrum of the rocker-arm, substantially as and for the purposes set forth.

5. In a cake machine, a feed-roller having a ratchet-wheel, a rocker-arm provided with a movable-block, a hand-wheel and set-screw for shifting said block, and links pivoted to said block and provided with pawls meshing with the said ratchet-wheel, substantially as and for the purposes set forth.

6. In a cake machine, a conveyer for feeding pans and other receptacles, a main-shaft and a driving-shaft geared together, a link and pawl-and-ratchet connections operated by the main-shaft and adapted to drive the conveyer and feed the pans or receptacles slowly for the reception of molded material, a link and pawl-and-ratchet connections operated by the driving-shaft and adapted to drive the conveyer and feed the pans and receptacles rapidly to and from the machine, substantially as and for the purposes set forth.

7. In a cake machine, a conveyer for pans and other receptacles, a main-shaft and a driving-shaft geared together, a link and pawl-and-ratchet connections operated by the main-shaft and adapted to drive the conveyer and feed each pan slowly for the reception of molded material, a pawl carried by an arm and adapted to mesh with a ratchet-wheel having a single space and adapted to drive the conveyer, and a link operated by a crank on the driving-shaft and adapted to operate said arm to feed the pans rapidly to and from the machine, substantially as and for the purposes set forth.

8. A cake machine, comprising a feed-roller provided with pivotal paddles having lugs, a cylindrical casing provided with a projection and a rib for rocking said paddles, a hopper, a reservoir, plungers penetrating the wall thereof, said reservoir having openings or molds in the base thereof, a conveyer, a movable-table, a driving-shaft provided with double cams engaging rollers depending from the table and rods depending from a yoke attached to the plungers, and means for operating the feed-roller and conveyer, substantially as and for the purposes set forth.

9. A cake machine, comprising a feed-roller provided with pivotal paddles having lugs, a cylindrical casing provided with a projection and a rib or arch for rocking and maintaining said paddles in the required position, a hopper, a reservoir, plungers penetrating the wall of said reservoir, the latter having openings, dies or molds in the base thereof, a conveyer, a movable table, a driving-shaft provided with double-cams engaging rollers depending from the table and rods depending from a yoke attached to the plungers, differential pawl-and-ratchet gear for feeding the conveyer, a rocker-arm adapted to operate links provided with pawls meshing with a ratchet-wheel on the feed-roller, and a hand-wheel and set-screw for adjusting the pivot of said links in respect to the fulcrum of the rocker-arm, substantially as and for the purposes set forth.

10. The combination, in a cake machine, of a rotatable feed-roller having peripheral paddles or deliverers provided with lugs journaled to end flanges thereof and mounted in a casing provided with a hopper and with a tapering throat or outlet at a corner thereof and connected with a reservoir provided with plungers and dies, molds or openings in the base thereof, an endless conveyer, a vertically movable table and mechanism for actuating said feed-roller, plunger and table so as to feed first slowly and then rapidly, substantially as and for the purposes set forth.

11. The combination, in a cake machine, of a rotatable feed-roller journaled in a partially recessed casing provided with an open top hopper, a contracted throat and communicating reservoir, arched ribs or projections in said casing, paddles or deliverers journaled to said roller and provided with lugs, plungers in said reservoir provided with openings, dies or molds in the base thereof, a conveyer and movable table, and mechanism, substantially as described, for intermittently and successively actuating said feed-roller, table and plungers, substantially as and for the purposes set forth.

12. In a cake machine, a rotatable feed-roller mounted in a partially recessed casing and provided with peripheral pivotal paddles or deliverers with lugs and means for causing said paddles or deliverers to assume and be maintained respectively in open and closed positions, substantially as and for the purposes set forth.

13. The combination, in a cake machine, of a rotatable feed-roller mounted in a casing provided with a hopper and with a contracted throat a reservoir provided with plungers and dies, molds or openings in the base thereof, guides located at different points of said casing, paddles pivotally connected with the surface of said roller and provided with pins or lugs adapted to contact with said guides to control the position of said paddles in their movement in said casing, a conveyer, a vertically movable table, and means for actuating said roller, conveyer and plunger and to feed said table first slowly and then rapidly, substantially as and for the purposes set forth.

14. In a cake machine, a casing provided with a hopper and a reservoir provided with plungers and dies, molds or openings, a feed-roller mounted in said casing and provided with pivotally supported peripheral paddles, guides for controlling the position thereof, and means for actuating said roller and plunger for discharging material into said reservoir from said hopper and depositing the molded material from the reservoir, substantially as and for the purposes set forth.

15. A cake machine, comprising a feed-roller provided with peripheral paddles, means for controlling the same in the travel thereof, a reservoir disposed adjacent thereto and directly connected with the housing or casing for said feed-roller and provided with plungers and dies, molds or openings, a movable-table, an endless conveyer for pans or receptacles operating independently of said table and mechanism, substantially as described, for operating the plungers, rotating the feed-roller, raising the table and feeding the pans or receptacles of the conveyer with a differential motion, substantially as and for the purposes set forth.

16. A cake machine provided with a feed-roller having pivotal paddles, means for controlling the positions thereof, plungers for depositing plastic material in molded form, a pan conveyer and movable table, and mechanism, substantially as described, for actuating said appliances or devices and for adjusting the feed while the machine is in motion, substantially as and for the purposes set forth.

17. A cake machine, comprising a rotatable feed-roller provided with peripheral paddles pivoted thereto and adapted to convey a plastic material to a reservoir having plungers and dies, molds or openings, a pan conveyer and movable table and means for actuating said appliances or devices of the machine with a positive motion and for adjusting the feed while said appliances or devices are in action, substantially as and for the purposes set forth.

18. In a cake machine, a rotatable feed-roller having peripheral movable paddles or deliverers mounted in a housing and provided with an open top hopper, a contracted throat or outlet and a reservoir provided with plungers movable in the top and dies, molds or openings in the bottom thereof, a shaft provided with cams, rods connected with said cams and plungers, and means for actuating said shaft, substantially as and for the purposes set forth.

19. In a cake machine, a rotatable feed-roller having paddles pivoted to the ends thereof and mounted in a housing provided with an open top hopper, a reservoir provided with plungers and dies, molds or openings connected with said housing by means of a contracted throat or outlet, a shaft provided with cams, levers or rods connected with said plungers and engaging said cams, a movable table, an endless conveyer actuated by means independently of said table, and means for actuating said levers or rods, conveyer and table at different rates of speed, substantially as and for the purposes set forth.

In testimony whereof I have hereunto set my signature in the presence of two subscribing witnesses.

PEMBROKE D. HARTON.

Witnesses:
   THOMAS M. SMITH,
   RICHARD C. MAXWELL.